(12) United States Patent
Epli et al.

(10) Patent No.: US 10,335,718 B2
(45) Date of Patent: Jul. 2, 2019

(54) FILTER INSERT FOR A FLUID, IN PARTICULAR TRANSMISSION OIL

(71) Applicant: Mann+Hummel GMBH, Ludwigsburg (DE)

(72) Inventors: Sven Epli, Heilbronn (DE); Guenter Jokschas, Murrhardt (DE); Marius Panzer, Stuttgart (DE); Jobst Eisengraeber-Pabst, Oberstenfeld (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 357 days.

(21) Appl. No.: 15/161,273

(22) Filed: May 22, 2016

(65) Prior Publication Data

US 2016/0339365 A1 Nov. 24, 2016

(30) Foreign Application Priority Data

May 22, 2015 (DE) .................... 10 2015 006 495

(51) Int. Cl.
| | | |
|---|---|---|
| *B01D 29/21* | (2006.01) | |
| *B01D 35/00* | (2006.01) | |
| *B01D 29/11* | (2006.01) | |
| *B01D 29/07* | (2006.01) | |
| *B01D 35/30* | (2006.01) | |

(52) U.S. Cl.
CPC ............. *B01D 29/07* (2013.01); *B01D 35/30* (2013.01); *B01D 2201/122* (2013.01); *B01D 2201/127* (2013.01); *B01D 2201/4023* (2013.01)

(58) Field of Classification Search
CPC ........ B01D 2201/122; B01D 2201/127; B01D 2201/4023; B01D 29/07; B01D 35/30
See application file for complete search history.

(56) References Cited

U.S. PATENT DOCUMENTS

| | | | |
|---|---|---|---|
| 2002/0174770 A1* | 11/2002 | Badeau ............... | C04B 38/0083 95/273 |
| 2005/0230324 A1* | 10/2005 | Peet ..................... | B01D 29/012 210/767 |
| 2006/0169632 A1* | 8/2006 | Suzuki .................. | B01D 29/07 210/493.1 |
| 2010/0229513 A1* | 9/2010 | Eisengraeber-Pabst .................... B01D 46/10 55/385.3 |

FOREIGN PATENT DOCUMENTS

WO 2011026999 A1 3/2011

* cited by examiner

*Primary Examiner* — Dirk R Bass
(74) *Attorney, Agent, or Firm* — James Hasselbeck

(57) ABSTRACT

A filter insert for a filter for filtering a fluid having] an inflow surface, and outflow surface, and a main throughflow direction. A filter body of the insert has a filter medium with pleats forming a pleated bellows, are arranged perpendicular to the main throughflow direction. A first number of the pleat edges form the outflow surface and a second number of the pleat edges on a pre-filtration side of the filtration body form the outflow surface. A first seal prevents the fluid from overflowing from the pre-filtration side to the post-filtration on a surface formed by a first number of of end face of the pleats. A second seal prevents the fluid from overflowing from the pre-filtration side to the post-filtration side on a surface formed by a second number of end faces of the pleats.

9 Claims, 4 Drawing Sheets

FILTER INSERT FOR A FLUID, IN PARTICULAR TRANSMISSION OIL

TECHNICAL FIELD

The invention relates to a filter insert for a filter for filtering a fluid, in particular transmission oil.

BACKGROUND OF THE INVENTION

The design of internal combustion engines seeks to make optimal use of the available installation space with a constant size. Accordingly, there is a requirement to design existing components with the smallest size possible, without including the functionality thereof.

In particular, in the field of transmission oil filters, a design has been developed with which the surface through which the transmission oil is to flow is as large as possible, while, at the same time, the depth to be penetrated is relatively small. Usually, furthermore, the transmission oil flows out perpendicular to the inflow direction. In practice, this leads to very high differential pressure.

SUMMARY

The present invention addresses the problem of providing a filter insert and a filter for a fluid such as transmission oil, which has a compact construction and yet also possesses an improved differential pressure.

The filter insert according to the invention for a filter for filtering a fluid such as transmission oil includes an inflow surface and an outflow surface. The filter insert according to the invention has a main throughflow direction.

The filter insert includes a filter body having a filter medium with pleats that has been folded into a pleated bellows. The pleat edges of the pleated bellows are arranged perpendicular to the main throughflow direction. A first number of the pleat edges form the outflow surface on the post-filtration side of the filter body. A second number of the pleat edges—on the pre-filtration side of the filter body—form the inflow surface. On the surface formed by a first number of end faces of the pleats, the pleated bellows has a first seal that prevents the fluid from overflowing from the pre-filtration side to the post-filtration side of the filter body. On the surface formed by a second number of end faces of the pleats, which lie opposite to the first number of end faces, the pleated bellows further includes a second seal that prevents the fluid from overflowing from the pre-filtration side to the post-filtration side of the filter body. The first and/or the second seal cover(s) only a part of the distance between the outflow surface and the inflow surface in a region of at least one pleat, thus opening up an outflow channel and/or inflow channel.

In particular, in the region having reduced coverage, only a part of the distance between the outflow surface and the inflow surface is covered, to the extent that the seal in this region has a reduced height in comparison to the adjoining regions. The seal has a rear displacement forming the outflow channel and/or the inflow channel. The reduced height or rear displacement preferably arises from the seal following one or more lower pleats and/or one or more spread pleats.

Covering only partially produces, on the end face-side surface of the filter body, an additional outflow or inflow cross-section through which fluid can flow in in the axial direction—i.e., in the direction of the pleat edges in the intermediate space between the pleats—or flow out therefrom. This reduces the differential pressure of the filter insert. Due to the fact that the pleat edges are arranged perpendicular to the main flow direction, there arises a flow, facilitated by the orientation of the pleat edges, through the end face-side openings in the first and/or second seal. This prevents the occurrence of turbulence and facilitates a laminar flow. This contributes to reducing the differential pressure of the filter insert.

A particularly preferable embodiment of the invention provides that the first and/or second seal take(s) the shape of the pleats. In this manner, a plurality of end face-side openings can be realized. At the same time, the end face of the pleated bellows is stabilized.

A particularly preferable embodiment of the invention provides that the first and/or second seal has/have a comb-like shape, at least in some regions. In this manner, one side of the pleated bellows—for example, the outflow side—is sufficiently stabilized, while the opposite side of the pleated bellows—for example, the outflow side—has a plurality of inflow or outflow channels on the end face.

In one embodiment according to the invention, it may be provided that the seal is a plastic frame that is mounted onto the pleated bellows at the end face side, and that is attachable, in particular, in an injection molding method. When an injection molding method is used, it is possible to have a particularly favorable connection between the filter medium and the plastic frame. The plastic material—for example, a polyamide—penetrates into the filter medium and thus forms a non-releasable connection.

Another advantageous development of the invention provides that the filter body includes at least one stability rib, which is distant from the end faces of the pleats, and which is attachable, in particular, in an injection molding method. One or more such stability ribs ensure that the pleated bellows retains its predetermined shape even at larger pressure differences or higher flow rates.

With a filter insert according to the invention, it may be provided that the filter body possesses a greater extension perpendicularly to the main throughflow direction than in the main throughflow direction. The approach according to the invention proves especially favorable with this geometry, because in this case, outflow or inflow channels at the end faces have a particularly advantageous effect.

It may also be provided that the outflow direction forms an angle of 90°±30°, preferably an angle of 90°±10°, and particularly preferably an angle of 90°±5°, with the main throughflow direction. The aforementioned angular ratios produce a particularly high differential pressure in the interaction with the aforementioned geometry of the filter body, because the fluid to be filtered must penetrate a broad filter surface by a short path on the one hand, and a deflection of the fluid flow by approximately 90° must take place on the other hand. The outflow or inflow channels according to the invention in the end face of the filter body are especially advantageous with the deflection of the fluid flow. These channels make a crucial contribution to reducing the differential pressure, and maintain a laminar flow at the same time.

Another development of the invention provides that at least one pleat—in particular, a number of adjacent pleats—has/have a lower height than the remaining pleats. "Height" is understood here to be the distance between the outflow surface and the inflow surface, i.e., simultaneously the distance between the inflow-side pleat edges and the outflow-side pleat edges. Reducing the height of one or more pleats produces, on the inflow side (pre-filtration side) and/or the outflow side (post-filtration side), an additional flow cross-section that advantageously extends into at least one corresponding end face-side opening in the first and/or second seal. Together with the outflow or inflow channels through the openings in the end face of the filter body, there thus also occurs a particularly laminar flow and a particularly lower differential pressure.

A particularly preferable embodiment of the invention provides that the at least one pleat having a lower height has a greater width than the remaining pleats. This entails, as it were, a stretched or spread pleat. In such a spread pleat, the pleat edges have, on the inflow surface and the outflow surface, each a greater distance from one another than do the remaining "normal" pleats. However, there may also be provided pleats having a lower height and the same width in comparison to the remaining (normal) pleats. According to one embodiment, the height of the pleats and/or the arrangement of the pleat edges follows the shape of a curvature, transversely to the height of the pleats.

The inventive idea may also be realized with a filter for a fluid such as transmission oil. A filter according to the invention includes a filter housing having an inflow opening and an outflow opening. The outflow opening is fixed an outflow direction. Such a filter also includes a filter insert according to the invention, which can be or is inserted into the filter housing, or is integral therewith.

BRIEF DESCRIPTION OF THE DRAWINGS

The invention shall now be described in greater detail with reference to the accompanying drawings.

DETAILED DESCRIPTION

Figure 1:
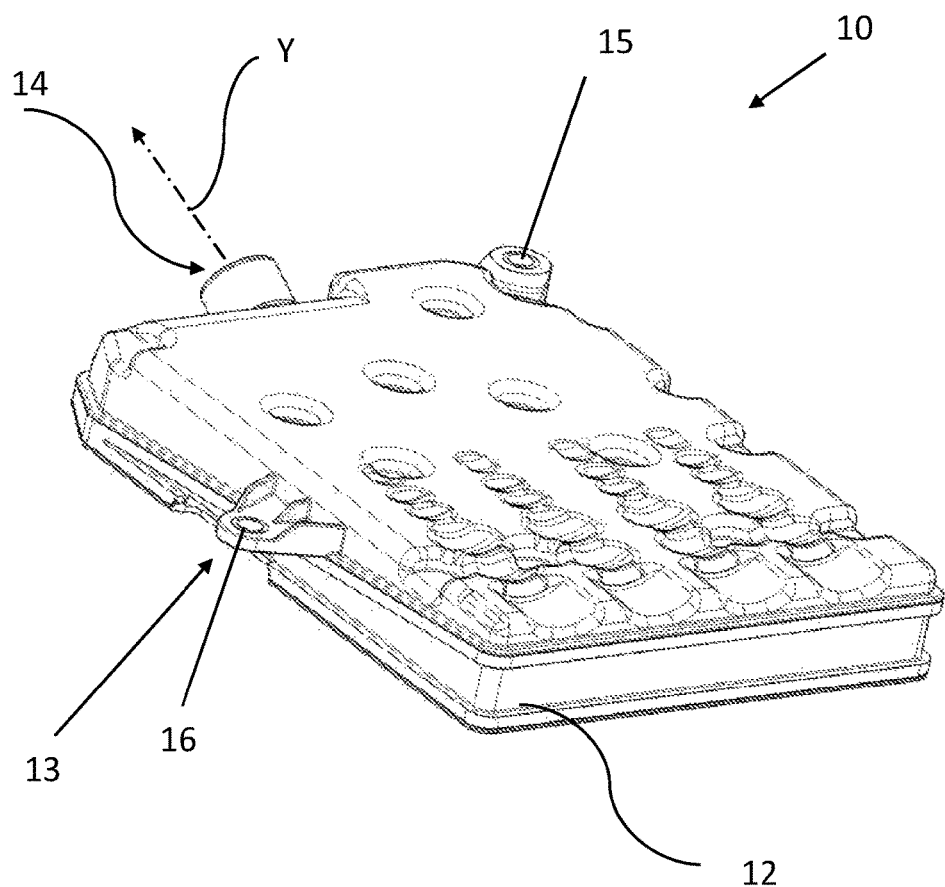
FIG. 1 illustrates a perspective view of a first embodiment of a filter according to the invention.
Figure 2:
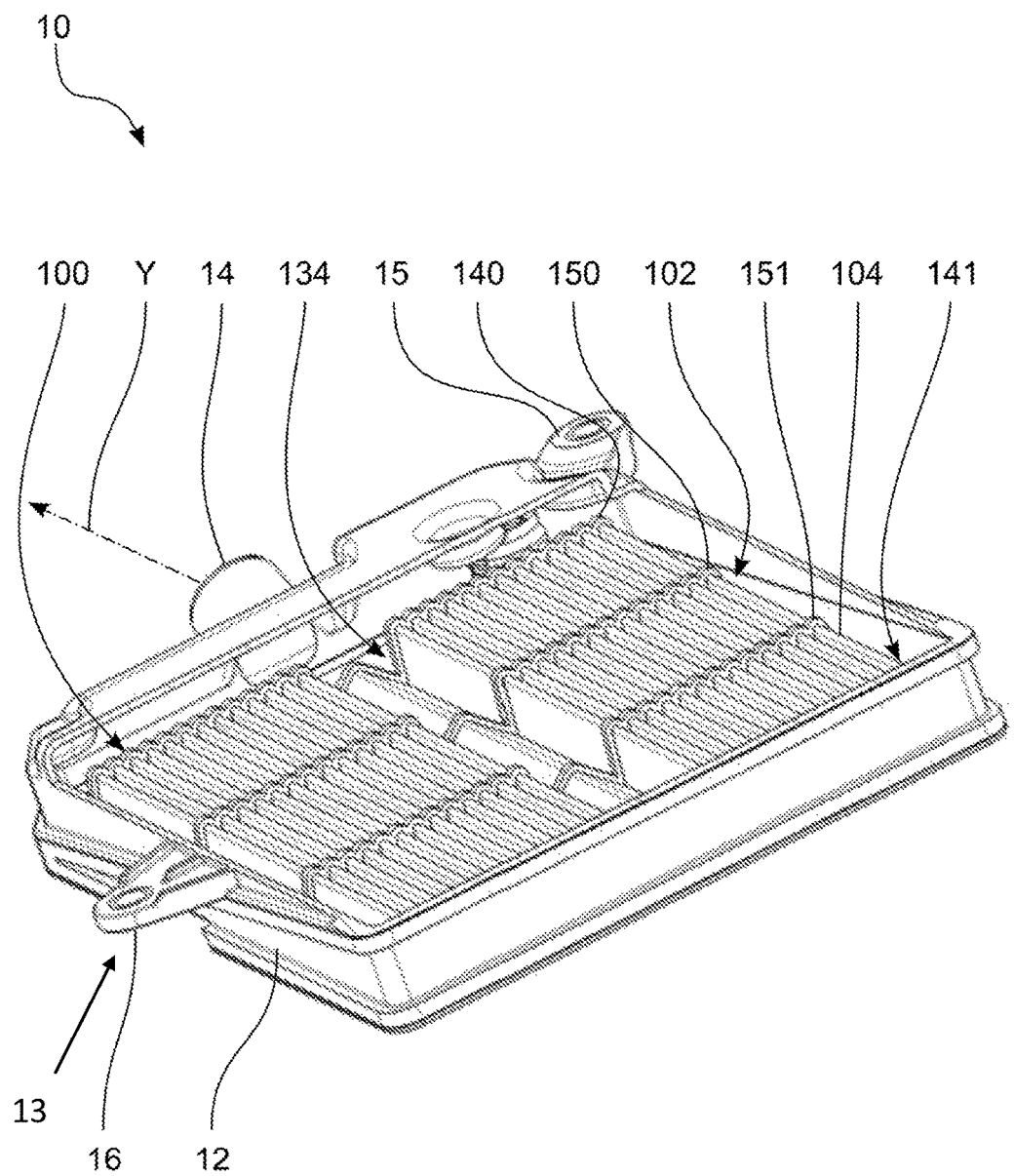
FIG. 2 illustrates a perspective view of the filter of FIG. 1, in an open state.
Figure 3:
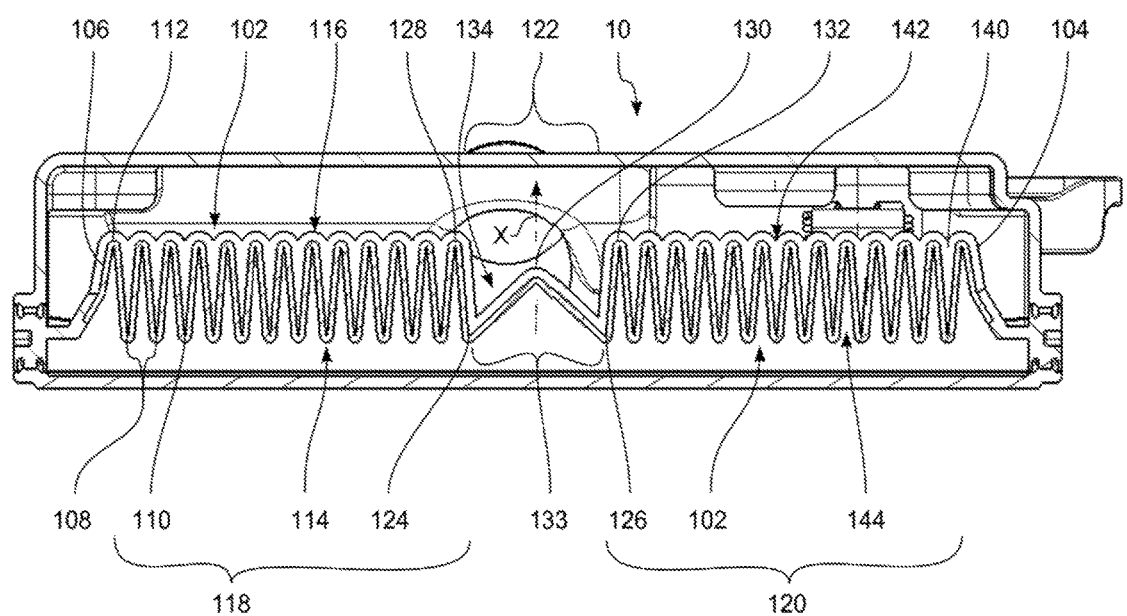
FIG. 3 illustrates a sectional view of the filter of FIG. 1.

FIG. 1-3 illustrate a first embodiment of a transmission oil filter 10 according to the invention. The transmission oil filter 10 depicted in FIG. 1-3 works in the suction operation. The transmission oil filter 10 has a housing 12 and an outflow opening 14. The inflow opening, which is arranged at a right angle to the outflow opening 14 in the embodiment depicted (though this is not compulsory), is designated with the reference sign "13".

FIG. 1 illustrates the transmission oil filter 10 in the closed state, while FIG. 2 illustrates the transmission oil filter 10 in the open state. Provided on the outside of the housing 12 are two fastening tabs 15, 16, in order to fasten the transmission oil filter 10 to the point of use thereof.

FIG. 2 illustrates the transmission oil filter 10 in the open state, and FIG. 3 illustrates a sectional view through the transmission oil filter 10 of FIG. 1. A filter insert 100 is inserted into the transmission oil filter 10. The filter insert 100 includes a filter body 102, which includes a pleated bellows 104. The pleated bellows 104 includes or is formed by a pleated filter medium 106. In the embodiment depicted, the filter insert 100 or the filter body 102 is produced so as to be integral with the housing 12, in particular, in the injection molding method. However, this is not compulsory.

Each pleat 108, 133 of the pleated bellows 104 has an inflow-side pleat edge 110 and an outflow-side pleat edge 112. The inflow-side pleat edges 110 form an inflow surface 114, and the outflow-side pleat edges 112 form an outflow surface 116. The main throughflow direction of the transmission oil filter 10 or the filter insert 100 is from the inflow surface 114 to the outflow surface 116—i.e., from down to up in FIG. 3. This is indicated in FIG. 3 by the axis X. After flowing through the pleated bellows 104, the filtered fluid (which here is transmission oil) leaves the filter housing 12 in the outflow direction Y, which is arranged substantially perpendicular to the main throughflow direction X. At the same time, the pleat edges 110, 112 are arranged substantially parallel to the outflow direction Y. Thus, the main fluid flow is deflected after flowing through the pleated bellows 104.

The pleated bellows 104 is essentially divided in three parts. Located between a first part 118 and second part 120, in which the inflow-side pleat edges 110 and outflow-side pleat edges 112 each have a first (in particular, constant) distance from one another, there is a third part 122 in which the inflow-side pleat edges 124 and 126 are at an increased distance from one another, in comparison to the first distance. The same also applies to the outflow-side pleat edges 128, 130, 132. These pleat edges 128, 130, 132 in the third part 122 are also at an increased distance from one another, in comparison to the first distance.

This results in a stretched or spread pleat, with pleat edge 130 in the center. In the embodiment depicted, the height of the pleat with the pleat edge 130 is reduced relative to the height of the pleats with the outflow-side pleat edges 112 in the first part 118 and the second part 120 of the pleated bellows 104. This produce a flow channel 134 on the outflow surface 116. The flow channel 134 makes it easier for the fluid to be filtered to flow out in the direction of the outflow direction Y of the filter housing 12.

As is especially apparent in FIG. 3, the end faces of the pleats 108, 133 (or those of the surface that is formed or covered by the end faces of the pleats 108, 133) are not sealed throughout the entire surface area thereof. Overall, the end face seal 140 (historically also called end face gluing) takes the shape of the pleats 108, 133. Particularly advantageously, the pleats 108, 133 on the outflow side (post-filtration side) are embedded into the material of the seal 140 (or 141 on the other end face; see FIG. 2). Advantageously, the pleats 108, 133 may be encapsulated by this material, in particular, plastic. However, whereas only comparatively small notches 142 are provided on the outflow surface 116 in the direction of the intermediate space between the pleats 108, 133 (in particular, going into the intermediate space), deep V-shaped notches 144 are provided on the inflow surface 114. The V-shaped notches 144 may be formed, in particular, by the entire intermediate spaces of the pleats 108, 133 on the inflow surface 114. The V-shaped notches 144 open up inflow channels laterally on the end face surfaces The inflow channels run parallel to the pleats 108, 133 or the pleat edges 110, 112, 124, 126, 128, 130, 132, and enable the fluid to be filtered to have an approximately laminar inflow into the filter body 102.

Transversely to the shape of the pleats 108, 133, stability ribs 150, 151 are provided parallel to the end face-side seals 140, 141. Like the seals 140, 141, these follow the shape of the folding of the pleated bellows 104, and ensure that the intended shape of the pleated bellows 104 is obtained even at high flow rates or high differential pressures.

Figure 4:
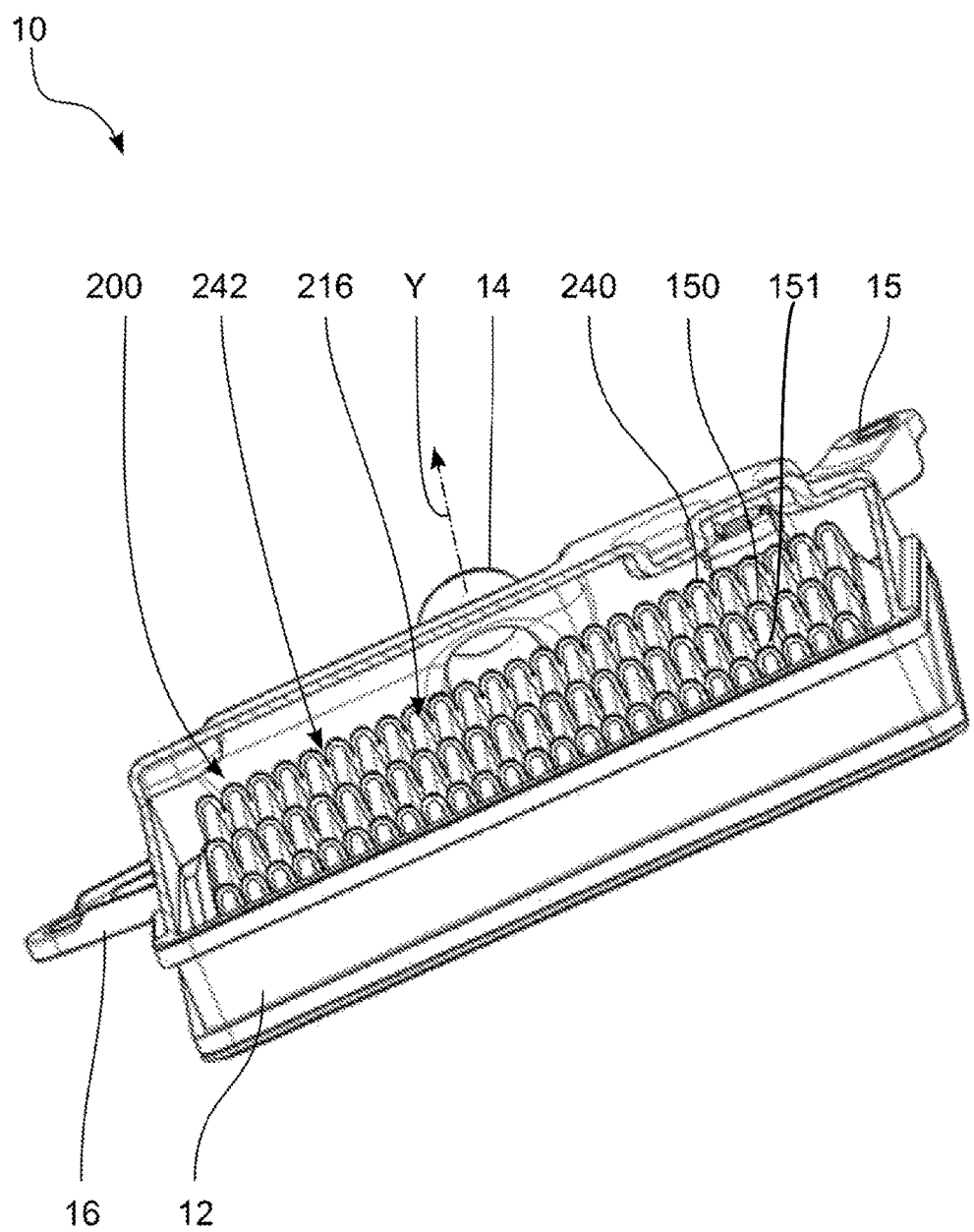
FIG. 4 illustrates a perspective view of a second embodiment of a filter according to the invention, in an open state.

FIG. 4 illustrates a perspective view of a second embodiment of a filter 10 according to the invention. In FIG. 4, like reference signs are provided to like (or comparable) features. In contrast to the first embodiment depicted in FIG. 1-3, the filter insert 200 is not divided into three parts. Stretched pleating is not provided. Instead, the outflow takes place exclusively via the outflow surface 216 and via the notches 242. Thus, the comparatively small notches 242 in the end face-side seal 240 contribute significantly to improving the flow behavior and to reducing the differential pressure. However, notches (not shown here in greater detail) are also advantageously provided on the inflow side, in a manner corresponding to the embodiment in FIG. 1-3.

What is claimed is:

1. A filter insert for a filter for filtering a fluid, comprising:
an inflow surface; and
an outflow surface, and having a main throughflow direction (X) and an outflow direction (Y);
a filter body including:
a filter medium with pleats that has been folded into a pleated bellows, edges of folds in the pleated bellows forming
inflow pleat edges on an inflow side of the pleated bellows; and
outflow pleat edges on an outflow side of the pleated bellows;
wherein the filter medium of the pleated bellows has a first lateral end face surface and an opposite second lateral end face surface, wherein the pleat edges extend across the filter bellows from the first lateral end face surface to the opposite second lateral end face surface;
wherein the pleat edges of the pleated bellows are arranged perpendicular to the main throughflow direction (X);
wherein a first number of the outflow pleat edges on a post-filtration side of the filter body form the outflow surface;
wherein a second number of the inflow pleat edges on a pre-filtration side of the filter body form the inflow surface;
wherein the pleated bellows has
a first seal arranged on the first lateral end face surface, preventing the fluid from overflowing from the pre-filtration side to the post-filtration side of the filter body; and
a second seal arranged on the second lateral end face surface, preventing the fluid from overflowing from the pre-filtration side to the post-filtration side of the filter body;
wherein the pleats at the outflow side of the filter bellows form V-shaped notches which extend from the inflow pleat edges to the outflow pleat edges
wherein at least one of the V-shaped notches of the pleats at the outflow side of the filter bellows is open laterally at the first lateral end face surface, and thus opens up an outflow channel and/or inflow channel;
wherein the first seal is a plastic frame that is mounted on the first lateral end face surface, the first lateral end face surface of the filter medium of the pleated bellows is covered by and embedded into the plastic frame;
wherein the at least one V-shaped notch of the pleats opens laterally through the plastic frame such that the outflow channel and/or inflow channel in the at least one of the V-shaped notch opens laterally through the plastic frame.

2. The filter insert according to claim 1, wherein the first and/or second seal takes the shape of the pleats.

3. The filter insert according to claim 1, wherein the first and/or second seal has a comb-like shape at least in some regions.

4. The filter insert according to claim 1, wherein the filter body comprises
at least one stability rib arranged spaced apart from the end faces of the pleats and is mounted to the filter body by injection molding.

5. The filter insert according to claim 1, wherein the filter body has a greater extension distance perpendicularly to the main throughflow direction (X) than an extension distance in the main throughflow direction (X).

6. The filter insert according to claim 1, wherein the outflow direction (Y) forms an angle between 60 degrees and 120 degrees relative to the main throughflow direction (X).

7. The filter insert according to claim 1, wherein at least one pleat or a number of adjacent pleats of the pleats has a lesser height than a height of the remaining pleats of the pleats.

8. The filter insert according to claim 7, wherein the at least one pleat or a number of adjacent pleats of the pleats having the lesser height have a greater width than the remaining pleats.

9. A filter for a fluid of transmission oil, comprising:
a filter housing, including:
an inflow opening; and
an outflow opening; and
a filter insert inserted into the filter housing, the filter insert including:
an inflow surface; and
an outflow surface, and having a main throughflow direction (X) and an outflow direction (Y);
a filter body including:
a filter medium with pleats that has been folded into a pleated bellows, edges of folds in the pleated bellows forming
inflow pleat edges on an inflow side of the pleated bellows; and
outflow pleat edges on an outflow side of the pleated bellows;
wherein the filter medium of the pleated bellows has a first lateral end face surface and an opposite second lateral end face surface, wherein the pleat edges extend across the filter bellows from the first lateral end face surface to the opposite second lateral end face surface;
wherein pleat edges of the pleated bellows are arranged perpendicular to the main throughflow direction (X);
wherein a first number of the pleat edges on a post-filtration side of the filter body form the outflow surface;
wherein a second number of the pleat edges on a pre-filtration side of the filter body form the inflow surface;
wherein the pleated bellows has
a first seal arranged on the first lateral end face surface, preventing the fluid from overflowing from the pre-filtration side to the post-filtration side of the filter body; and
a second seal arranged on the second lateral end face surface, preventing the fluid from overflowing from the pre-filtration side to the post-filtration side of the filter body;

wherein the pleats at the outflow side of the filter bellows form V-shaped notches which extend from the inflow pleat edges to the outflow pleat edges wherein at least one of the V-shaped notches of the pleats at the outflow side of the filter bellows is open laterally at the first lateral end face surface, and thus opens up an outflow channel and/or inflow channel;

wherein the first seal is a plastic frame that is mounted on the first lateral end face surface, the first lateral end face surface of the filter medium of the pleated bellows is covered by and embedded into the plastic frame;

wherein the at least one V-shaped notch of the pleats opens laterally through the plastic frame such that the outflow channel and/or inflow channel in the at least one of the V-shaped notch opens laterally through the plastic frame.

* * * * *